United States Patent
Madhavarao et al.

(10) Patent No.: US 7,681,135 B2
(45) Date of Patent: Mar. 16, 2010

(54) SYSTEM AND METHOD FOR GENERATING A COMPOSITE SOURCE USER INTERFACE

(75) Inventors: Sankarshana Madhavarao, Lake Forest, CA (US); Man Mohan Garg, Cerritos, CA (US); Alok Mathur, Lake Forest, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 334 days.

(21) Appl. No.: 11/463,792

(22) Filed: Aug. 10, 2006

(65) Prior Publication Data

US 2008/0040670 A1    Feb. 14, 2008

(51) Int. Cl.
*G06F 3/00* (2006.01)
*G06F 3/048* (2006.01)

(52) U.S. Cl. .................. 715/744; 715/762; 715/765; 715/866

(58) Field of Classification Search .......... 715/762, 715/760, 765, 780, 866, 744
See application file for complete search history.

(56) References Cited

U.S. PATENT DOCUMENTS

| | | | | | |
|---|---|---|---|---|---|
| 5,754,173 | A | * | 5/1998 | Hiura et al. | 715/744 |
| 6,339,755 | B1 | * | 1/2002 | Hetherington et al. | 704/8 |
| 6,396,515 | B1 | * | 5/2002 | Hetherington et al. | 715/762 |
| 6,476,828 | B1 | * | 11/2002 | Burkett et al. | 715/760 |
| 6,571,253 | B1 | * | 5/2003 | Thompson et al. | 707/103 R |
| 6,996,771 | B1 | * | 2/2006 | O'Brien | 715/207 |
| 7,103,611 | B2 | * | 9/2006 | Murthy et al. | 707/102 |
| 7,120,645 | B2 | * | 10/2006 | Manikutty et al. | 707/102 |
| 7,191,395 | B2 | * | 3/2007 | Adler et al. | 715/236 |
| 7,213,200 | B2 | * | 5/2007 | Abe et al. | 715/230 |
| 7,305,414 | B2 | * | 12/2007 | Manikutty et al. | 707/102 |
| 7,315,981 | B2 | * | 1/2008 | Nakamura et al. | 715/234 |
| 2003/0025732 | A1 | * | 2/2003 | Prichard | 345/765 |
| 2003/0110442 | A1 | * | 6/2003 | Battle | 715/500 |
| 2003/0128239 | A1 | * | 7/2003 | Angal et al. | 345/762 |
| 2003/0182632 | A1 | * | 9/2003 | Murdock et al. | 715/536 |
| 2003/0200502 | A1 | * | 10/2003 | Abe et al. | 715/500 |
| 2004/0019848 | A1 | * | 1/2004 | Nguyen et al. | 715/513 |
| 2004/0056894 | A1 | * | 3/2004 | Zaika et al. | 345/762 |
| 2004/0230911 | A1 | * | 11/2004 | Bent et al. | 715/762 |
| 2005/0091584 | A1 | * | 4/2005 | Bogdan et al. | 715/514 |
| 2005/0183006 | A1 | * | 8/2005 | Rivers-Moore et al. | 715/513 |
| 2005/0289457 | A1 | * | 12/2005 | Obasanjo et al. | 715/513 |
| 2006/0077440 | A1 | * | 4/2006 | Stevens et al. | 358/1.15 |

* cited by examiner

*Primary Examiner*—Tadesse Hailu
*Assistant Examiner*—Nicholas S Ulrich
(74) *Attorney, Agent, or Firm*—Tucker Ellis & West LLP (57) ABSTRACT

The subject application is directed to a system and method for generating a composite source user interface. A text query corresponding to a text element associated with a graphical element on a display of the associated user interface is first received by a backend component. The received text query data is then directed to a data document on the associated data storage. Text data is then received from the data document of the associated data storage. Thereafter, the received text data is then communicated to the associated user interface so as to generate indicia on the associated user interface. Preferably, the indicia includes a graphical element and the text data, such as, for example and without limitation, an icon and associated text, or the like.

19 Claims, 5 Drawing Sheets

SYSTEM AND METHOD FOR GENERATING A COMPOSITE SOURCE USER INTERFACE

BACKGROUND OF THE INVENTION

The subject application is directed to a system and method for generating a composite source user interface. More particularly, the subject application is directed to a system and method for generating a user interface wherein selected components of the user interface are generated and stored by separate components. The subject application provides the ability to generate or modify a user interface much more quickly and easily.

Generally, user interfaces, such as those provided on a document processing device, undergo frequent modification due to a variety of reasons, such as new user requirements, a new user interface framework, or the addition of features to be provided by the document processing device. In the past, user interfaces have been designed such that the graphical presentation component for the user interface is created and integrated with the text presentation component. Therefore, if the text of the user interface must be changed, such as to correct an error, update an interface, or to translate the text to another language, the entire user interface must be modified, including the graphical presentation, which is time consuming and prone to error. User interfaces have also been designed such that the text presentation component of the user interface is generated and managed by a system or component separate from the user interface. The graphical presentation component is generated and managed by the user interface itself. However, in such design, the interaction between the user interface and the system managing the text presentation suffers from delay insofar as text must be retrieved and merged into a composite graphical and text interface.

It is desirable to have a system and method by which a text portion of a user interface is able to be created, amended or altered quickly, while simultaneously allowing access to text very quickly and with assured data integrity.

SUMMARY OF THE INVENTION

In accordance with the subject application, there is provided a system and method for generating a composite source user interface.

Further, in accordance with the subject application, there is provided a system and method for generating a user interface wherein selected components of the user interface are generated and stored by separate components.

Still further, in accordance with the subject application, there is provided a system and method by which a text portion of a user interface is able to be created, amended or altered quickly, while simultaneously allowing access to text very quickly and with assured data integrity.

Still further, in accordance with the subject application, there is provided a system for generating a user interface. The system includes means adapted for receiving a text query corresponding to a text element associated with a graphical element on a display of an associated user interface and means adapted for directing a received text query to a data document of an associated data storage. The system also includes means adapted for receiving text data from the data document of the associated data storage and means adapted for communicating received text data to the associated user interface so as to generate an indicia thereon inclusive of a graphical element and the text data.

In one embodiment, the system further comprises synchronizing means adapted for synchronizing content of the data document with the indicia such that modifications made to text data of the data document are reflected in the indicia. Preferably, the synchronizing means includes means adapted for sensing a modification to the data document and notification means adapted for commencing an update of text data of the indicia in accordance with a sensed modification.

In another embodiment, the received text query is directed to a selected data document of an associated storage in accordance with preference data. Preferably, the preference data includes data representative of a selected language.

In yet another embodiment, the text query is comprised of an XPath query. In a more preferred embodiment, the data document is comprised of a document object model.

Still further, in accordance with the subject application, there is provided a method for generating a composite source user interface in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for generating a composite source user interface. In particular, the subject application is directed to a system and method for generating a user interface wherein selected components of the user interface are generated and stored by separate components. More particularly, the subject application is directed to a system and method by which a text portion of a user interface is able to be created, amended or altered quickly, while simultaneously allowing access text very quickly and with assured data integrity. It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
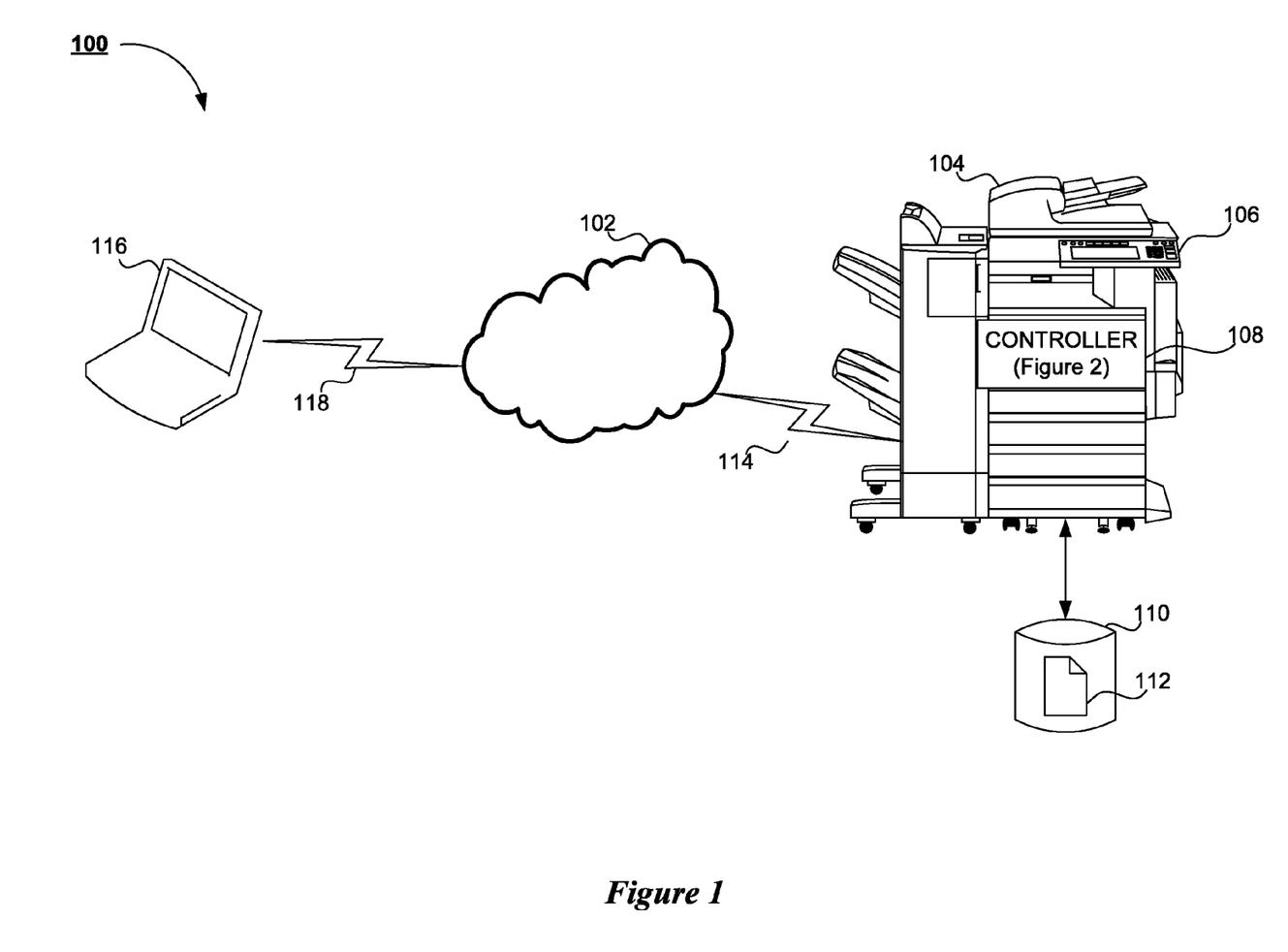
FIG. 1 is an overall diagram of the system for generating a composite source user interface according to the subject application.

Referring now to FIG. 1, there is shown an overall diagram of the system 100 for generating a composite source user interface in accordance with the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. Preferably, the document processing device 104 is communicatively coupled to the computer network 102 via a suitable communications link 114. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, the document processing device 104 further incorporates a controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for generating a composite source user interface of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a data document 112, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like. The data document 112 is representative of any object oriented application programming interface that enables the parsing of a programming language into a well defined tree structure and operating on its contents, such as for example and without limitation, a document object module. Preferably, the data document 112 includes data representative of text presentation data, graphical presentation data, text data, graphical data, indicia, or the like.

The system 100 illustrated in FIG. 1 further depicts a user device 116, in data communication with the computer network 102 via a communications link 118. It will be appreciated by those skilled in the art that the user device 116 is shown in FIG. 1 as a laptop computer for illustration purposes only. As will be understood by those skilled in the art, the user device 116 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 118 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 116 is suitably adapted to generate and transmit electronic documents, document processing instructions, user interface modifications, upgrades, updates, personalization data, or the like, to the document processing device 104, or any other similar device coupled to the computer network 102.

Figure 2:
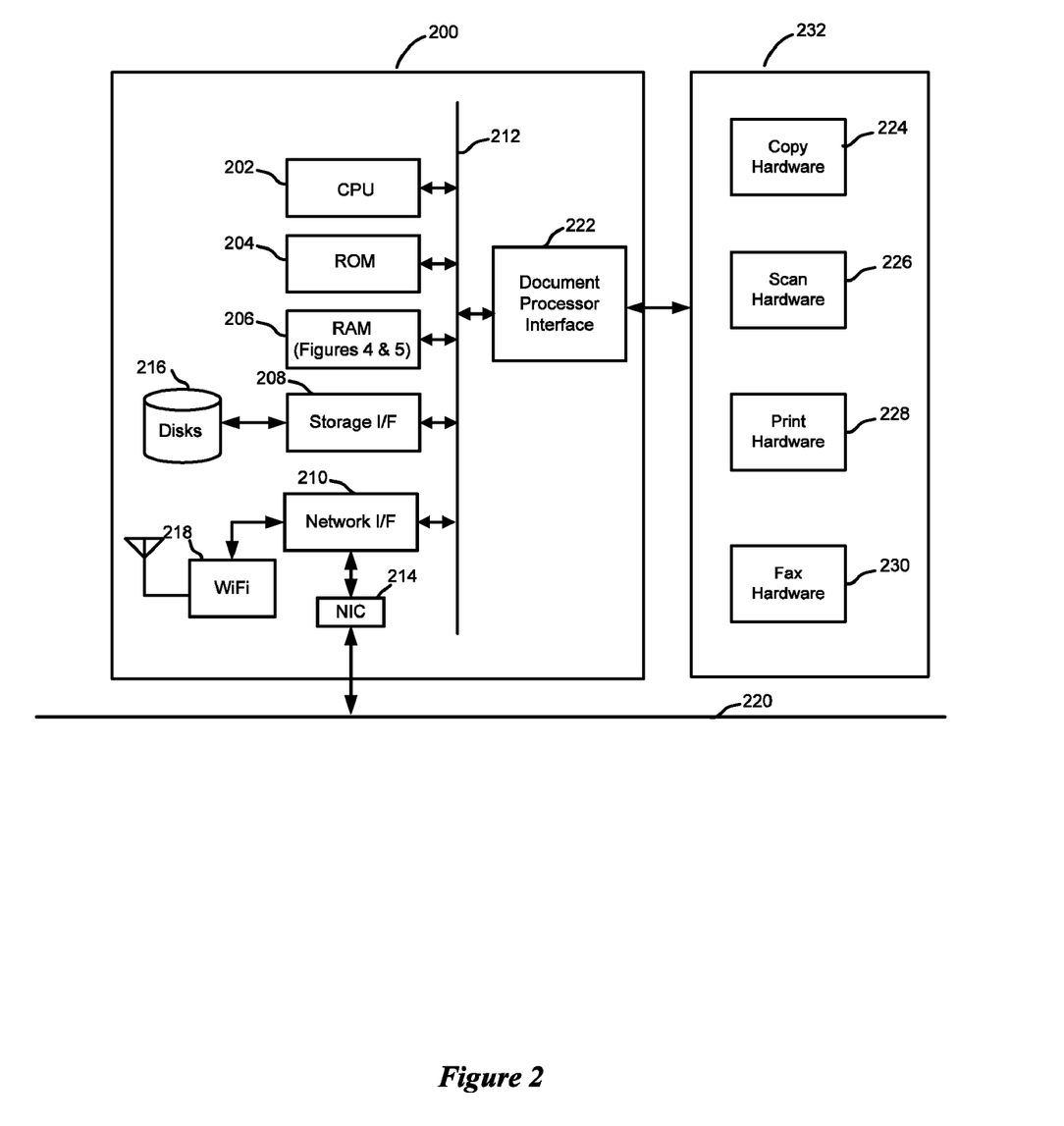
FIG. 2 is a block diagram illustrating controller hardware for use in the system for generating a composite source user interface according to the subject application.

Turning now to FIG. 2, illustrated is a representative architecture of a suitable controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, illustrated in FIG. 1 as the storage device 110, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with bus 212 is a document processor interface 222. Document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
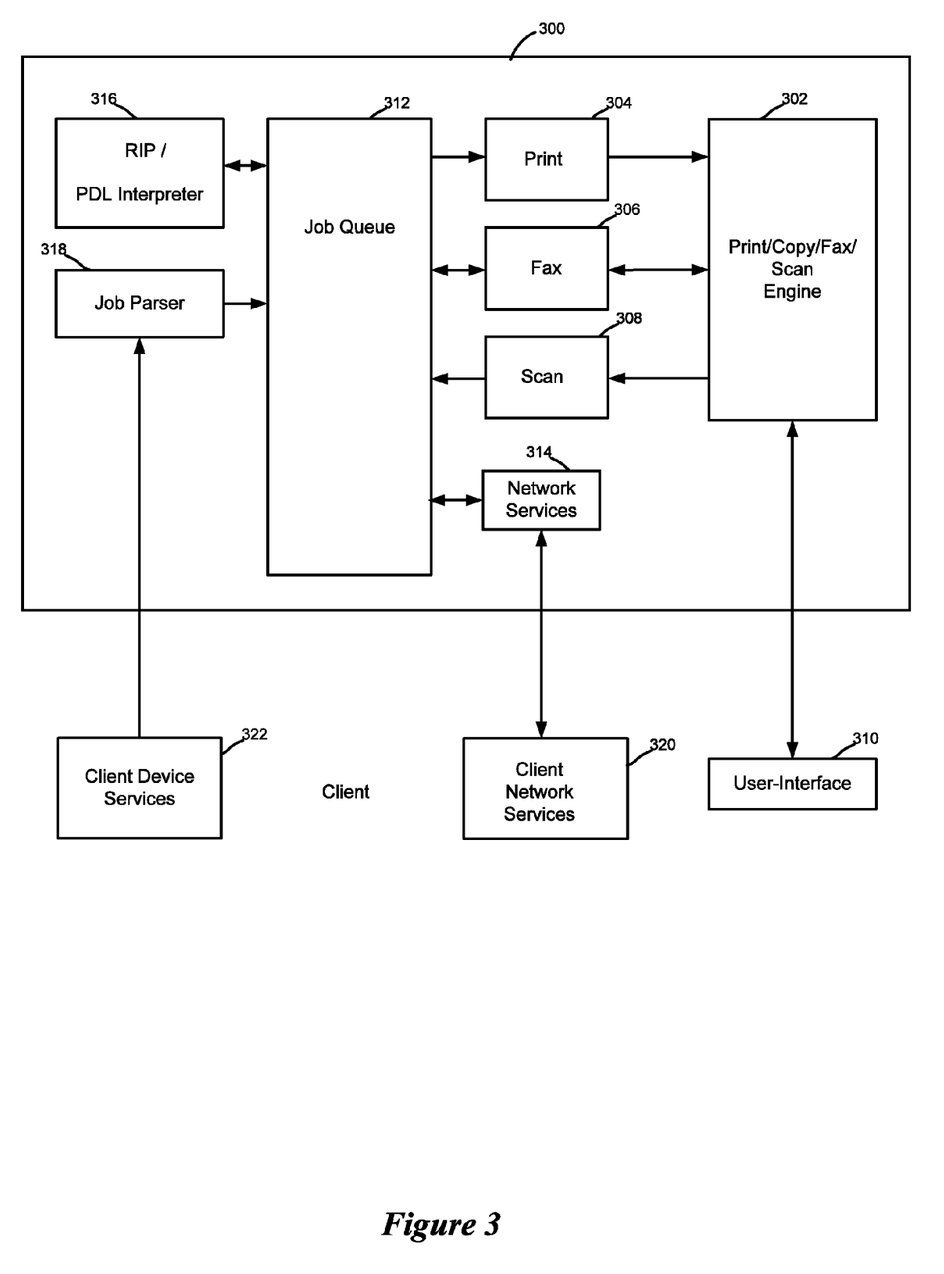
FIG. 3 is a functional diagram illustrating the controller for use in the system for generating a composite source user interface according to the subject application.

Functionality of the subject system 100 is accomplished on a suitable document processing device 104 that includes the controller 200 of FIG. 2, (shown in FIG. 1 as the controller 108), as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, when the text portion of a user interface is to be modified, such as changing the language, correcting spelling, updating settings, or the like, a text query corresponding to a text element associated with a graphical element on a display of the associated user interface is first received. Preferably, a backend component, such as the controller 108 or other suitable computing device, receives the text query from the user interface 106 corresponding to a text element associated with a graphical element displayed on the user interface 106. The received text query data is then directed to a data document on the associated data storage. That is, the backend component directs the text query to a data document 112 stored on the associated data storage device 110. The skilled artisan will appreciate that the data document 112 is capable of implementation as, for example and without limitation, a document object model document. Preferably, the text query is in the form of an XPath query. Text data is then received from the data document of the associated data storage. The skilled artisan will appreciate that in response to the XPath query, the backend component receives text data from the data document 112 of the associated data storage device 110. Thereafter, the received text data is then communicated to the associated user interface so as to generate indicia on the associated user interface. Preferably, the indicia includes a graphical element and the text data, such as, for example and without limitation, an icon and associated text, or the like. Thus, the skilled artisan will appreciate that the backend component communicates the received text data from the data document 112 to the user interface 106.

The preceding will better be understood in conjunction with examples, such as use of the subject application in conjunction with the graphical user interface implemented on a document processing device. It will be apparent, however, to those skilled in the art that the subject application is capable of implementation in any computer system employing a user interface comprising graphical presentation and/or text presentation. In this example, the backend component of the document processing device 104, such as the controller 108, or suitable components thereof, receives a text query from the user interface 106 via any suitable means known in the art. For purposes of this example, the controller 108 is used herein to refer to any backend component, i.e., a component distinct from but in data communication with the user interface 106. Preferably, the text query sent by the user interface 106 to the controller 108 corresponds to an XPath query. As the skilled artisan will appreciate, the user interface 106 uses XPath queries to retrieve data from a document object model data document 112. Thus, the controller 108 directs the text query to the data document 112 via any suitable means known in the art. In accordance with the subject application, the text query is directed advantageously to a selected data document 112 according to preference data. Preferably, the preference data corresponds to a selected language, or the like. Thus, as will be appreciated by those skilled in the art, the text query is capable of being directed to a data document 112 on the associated storage 110 in accordance with a selected language. The appropriate response to the query is then received by the controller 108 from the data document 112, whereupon it is communicated to the associated user interface 106.

The user interface 106 then generates indicia including a graphical element and the text data received from the data document 112. The backend component, e.g., the controller 108, then monitors the data document 112 for modifications thereto. Thus, as will be understood by those skilled in the art, a change in the language of the text data, the font, the style, or the like, will first be implemented in the data document 112. Such changes are advantageously detected by the controller 108, whereupon an update to the text data of a given indicia is commenced. For example, modifications to the text data are capable of originating via the user device 116 and transmitted to the controller 108 associated with the document processing device 104 via the computer network 102. The modifications to the text data are then reflected in the data document 112 stored on the associated data storage device 110. The skilled artisan will appreciate that such modifications are equally capable of being initiated via direct input at the user interface 106 of the document processing device 104 by an associated user. Thereafter, the content of the data document 112 with the indicia is synchronized such that modifications made to the text data of the data document 112 are reflected in the indicia associated with the user interface 106. The skilled artisan will appreciate that the subject application enables the user interface 106 to read directly from the persistent data document 112, and employ the backend component to write data to the data document 112, which then facilitates the synchronization of all views.

In accordance with one example embodiment of the subject application, the data required for displaying the user interface is modeled as an XML schema. The backend component contains a document object model document (the run time instance of the XML schema), e.g., the data document 112, and provides interfaces to Get/Set/Subscribe values in the data document 112. User interface components design their presentation by specifying an XPath query as the data source for each indicia in the presentation. At run time, user interface components use this XPath query to retrieve indicia data from the backend component and paint the user interface screens. The action of retrieving the data occurs rapidly, as there are no computations or assembling of data required. That is, the data is readily available in the data document 112. Thus, as the skilled artisan will appreciated, specification of the indicia data-source in terms of XPath queries speeds up the data lookup. Upon receipt of inputs from an associated user, user interface components request the backend component to set values for a particular node in the data document 112 by providing the XPath query and the value to be changed. The backend component performs the set operation to the data document 112. The user interface components then register with the backend component for receiving notifications on parts of the data document 112. As such parts of the data document 112 are modified (based on associated user actions), the backend component notifies all subscribing components, thereby giving an opportunity for the subscribing user interface components to refresh their respective presentations.

Figure 4:
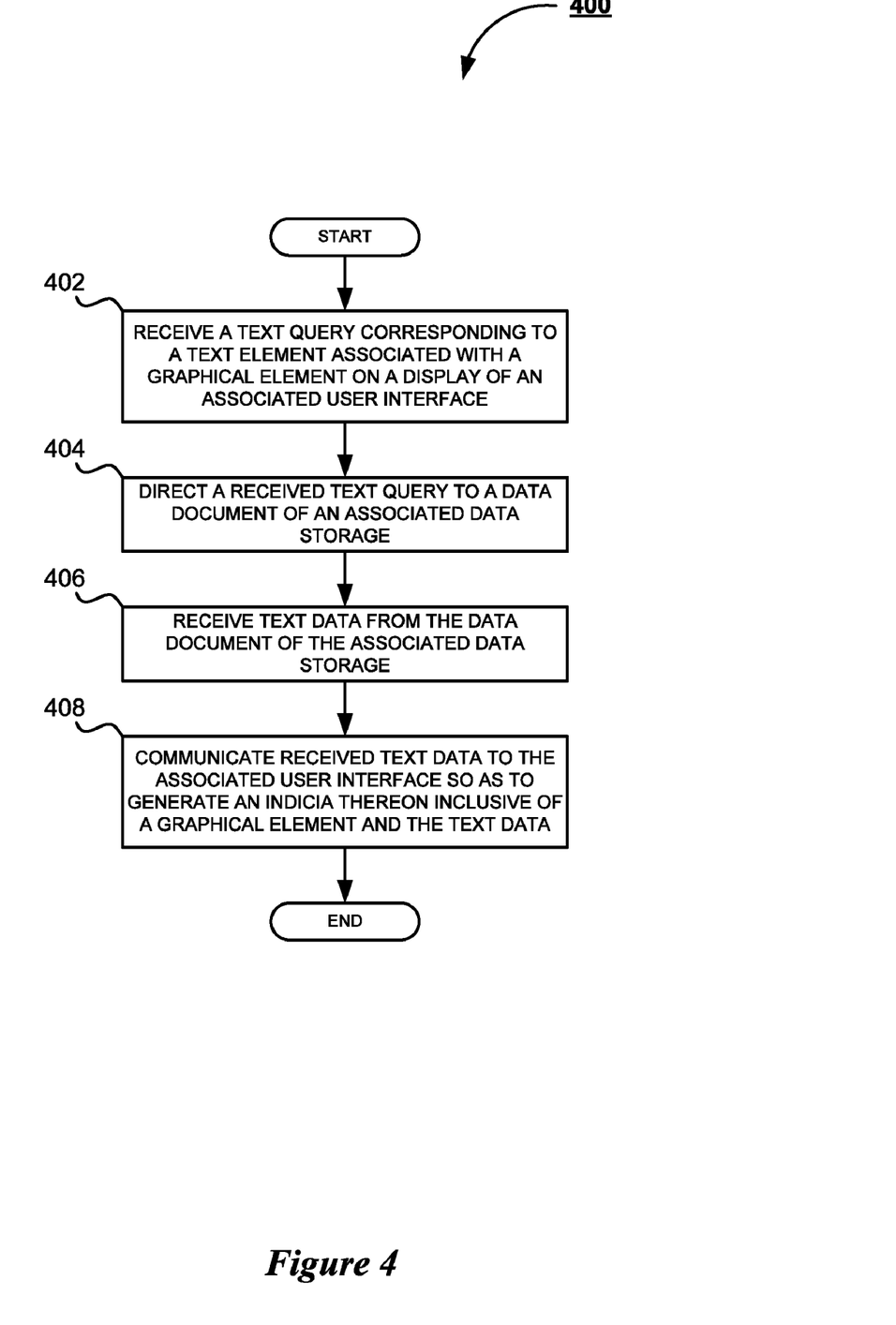
FIG. 4 is a flowchart illustrating a method for generating a composite source user interface according to the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a method for generating a composite source user interface in accordance with the subject application. Beginning at step 402, a text query is received corresponding to a text element associated with a graphical element on a display of an associated user interface. The received text query is then directed, at step 404, to a data document of an associated data storage. At step 406, text data from the data document of the associated data storage is received. The received text data is then communicated, at step 408, to the associated user interface so as to generate an indicia thereon inclusive of a graphical element and the text data.

Figure 5:
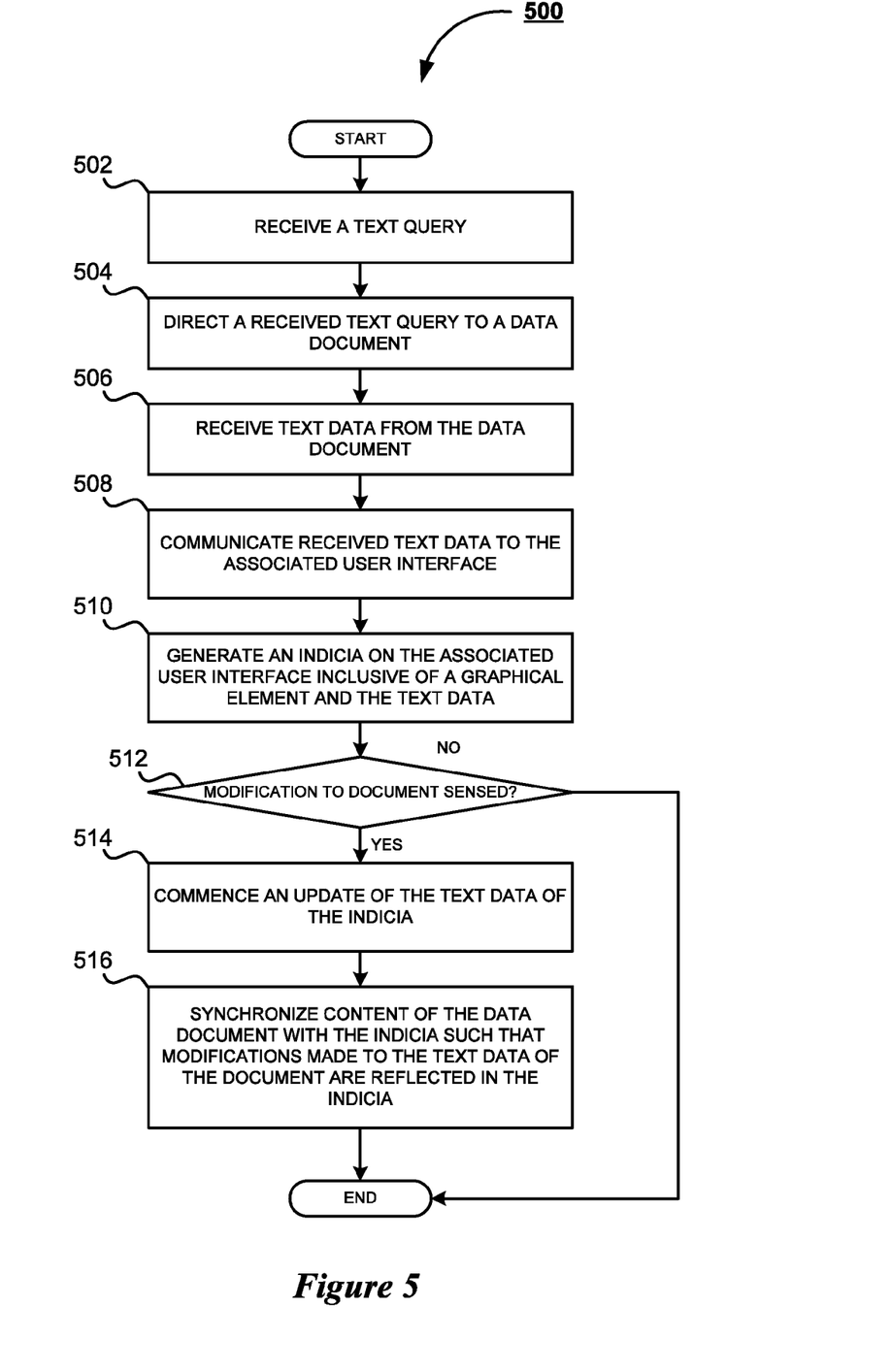
FIG. 5 is a flowchart illustrating a method for generating a composite source user interface according to the subject application.

Referring now to FIG. 5, there is shown a flowchart 500 illustrating a method for generating a composite source user interface in accordance with the subject application. The skilled artisan will appreciate that the methodology depicted in FIG. 5 corresponds to graphical and/or text presentation, as applied to a user interface associated with a document processing device. The use of the subject methodology implemented with respect to a user interface of an associated document processing device is for illustration purposes, and the subject application is not limited only to such an implementation. The method begins at step 502, wherein a text query is received by a backend component, such as the controller 108 from an associated user interface 106. The controller 108 then directs the received text query, at step 504, to a data document 112 stored on the associated data storage device 110. Preferably, the data document 112 is a document object model document, as is known in the art. In accordance with the subject application, the text query is directed advantageously to a selected data document 112 according to preference data. Preferably, the preference data corresponds to a selected language, or the like. Thus, as will be appreciated by those skilled in the art, the text query is capable of being directed to a data document 112 on the associated storage 110 in accordance with a selected language. At step 506, the controller 108 receives text data from the data document 112. As will be appreciated by those skilled in the art, the received text data corresponds, for example and without limitation, to updated, upgrade, or modified, text presentation for use by the associated user interface 106.

At step 508, the text data received from the data document 112 is then communicated by the controller 108 to the associated user interface 106. Thereafter, at step 510 an indicia is generated on the associated user interface 106 including a graphical element and the received text data. A determination is then made at step 512 whether the controller 108 has detected any modifications to the data document 112. When no such modification is detected, the methodology depicted in FIG. 5 terminates. When the controller 108 detects a modification to the data document 112, flow proceeds to step 514, whereupon the controller 108 commences an update of the text data associated with the indicia. At step 516, the controller 108 facilitates the synchronization of the content of the data document 112 with the indicia, such that modifications made to the text data of the data document 112 are reflected in the indicia.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A composite source user interface generator comprising:
    means adapted for receiving a query corresponding to a user interface element associated with a graphical document processing device control element on a display of an associated user interface;
    means adapted for directing an instruction corresponding to a received query to a corresponding data document of an associated remote data storage, the data document including a plurality of text strings;
    means adapted for receiving display data from the data document of the remote data storage, the display data including a plurality of graphical depictions, each of which has one of the plurality of text strings corresponding thereto;
    means adapted for performing an operation on the data document corresponding to the query and received document data so as to generate a plurality of display views corresponding thereto;
    means adapted for communicating received display data to the associated user interface so as to generate an indicia thereon inclusive of a graphical element and corresponding text string retrieved from the data document, such that the combination is reflective of the performed operation in each of the plurality of views;
    means adapted for sensing a modification to the data document;
    notification means adapted for commencing an update of display data of the indicia in accordance with a sensed modification so as to synchronize content of the data document with the indicia such that modifications made to the data document are reflected simultaneously in the indicia by a display of the content in accordance with the graphical document processing device control element in each of the plurality of views;

means adapted for receiving selection data on the associated user interface corresponding to a selection of the graphical element; and means adapted for commencing the operation on at least one selected electronic document device in accordance with an operation linked to the selected graphical element.

2. The composite source user interface generator of claim 1 wherein the received query is directed to a selected data document of a remote data storage in accordance with preference data.

3. The composite source user interface generator of claim 2 wherein the preference data includes data representative of a selected language.

4. The composite source user interface generator of claim 1 wherein the query is comprised of an XPath query.

5. The composite source user interface generator of claim 4 wherein the data document is comprised of a document object model.

6. A method for generating a composite source user interface comprising the steps of:

receiving a query corresponding to a user interface element associated with a graphical document processing device control element on a display of an associated user interface;

directing an instruction corresponding to a received query to a corresponding data document of a corresponding remote data storage, the data document including a plurality of text strings;

receiving display data from the data document of the remote data storage, the display data including a plurality of graphical depictions, each of which has one of the plurality of text strings corresponding thereto;

performing an operation on the data document corresponding to the query and received document data so as to generate a plurality of display views corresponding thereto;

communicating received display data to the associated user interface so as to generate an indicia thereon inclusive of a graphical element and corresponding text string retrieved from the data document, such that the combination is reflective of the performed operation in each of the plurality of views;

sensing a modification to the data document;

commencing an update of display data of the indicia in accordance with a sensed modification so as to synchronize content of the data document with the indicia such that modifications made to the data document are reflected simultaneously in the indicia by a display of the content in accordance with the graphical document processing device control element in each of the plurality of views;

receiving selection data on the associated user interface corresponding to a selection of the graphical element; and commencing operation on at least one selected electronic document device in accordance with an operation linked to the selected graphical element.

7. The method for generating a composite source user interface of claim 6 wherein the received query is directed to a selected data document of a remote data storage in accordance with preference data.

8. The method for generating a composite source user interface of claim 7 wherein the preference data includes data representative of a selected language.

9. The method for generating a composite source user interface of claim 6 wherein the query is comprised of an XPath query.

10. The method for generating a composite source user interface of claim 9 wherein the data document is comprised of a document object model.

11. A computer-implemented method for generating a composite source user interface comprising the steps of:

receiving a query corresponding to a user interface element associated with a graphical document processing device control element on a display of an associated user interface;

directing an instruction corresponding to a received query to a data document of a corresponding remote data storage, the data document including a plurality of text strings;

receiving display data from the data document of the remote data storage, the display data including a plurality of graphical depictions, each of which has one of the plurality of text strings corresponding thereto;

performing an operation on the data document corresponding to the query and received document data so as to generate a plurality of display views corresponding thereto;

communicating received document data to the associated user interface so as to generate an indicia thereon inclusive of a graphical element and corresponding text string retrieved from the data document, such that the combination is reflective of the performed operation in each of the plurality of views;

sensing a modification to the data document;

commencing an update of display data of the indicia in accordance with a sensed modification so as to synchronize content of the data document with the indicia such that modifications made to the data document are reflected simultaneously in the indicia by a display of the content in accordance with the graphical document processing device control element in each of the plurality of views;

receiving selection data on the associated user interface corresponding to a selection of the graphical element; and commencing operation on at least one selected electronic document device in accordance with an operation linked to the selected graphical element.

12. The computer-implemented method for generating a composite source user interface of claim 11 wherein the received query is directed to a selected data document of a remote data storage in accordance with preference data and wherein the preference data includes data representative of a selected language.

13. The computer-implemented method for generating a composite source user interface of claim 11 wherein the query is comprised of an XPath query.

14. The computer-implemented method for generating a composite source user interface of claim 13 wherein the data document is comprised of a document object model.

15. A composite source user interface generator comprising:

an input operable to receive a query corresponding to a user interface element associated with a graphical document processing device control element on a display of an associated user interface;

a processor operable to direct an instruction corresponding to a received query to a corresponding data document of an associated remote data storage, the data document including a plurality of text strings;

an input operable to receive display data from the data document of the remote data storage, the display data including a plurality of graphical depictions, each of which has one of the plurality of text strings corresponding thereto;

the processor further operable to perform an operation on the data document corresponding to the query and received document data so as to generate a plurality of display views corresponding thereto;

an output operable to communicate display data to the associated user interface so as to generate an indicia thereon inclusive of a graphical element and corresponding text string retrieved from the data document, such that the combination is reflective of the performed operation in each of the plurality of views;

the processor further operable to test for a modification to the data document;

a notification output operable to output an update of display data of the indicia in accordance with a tested modification so as to synchronize content of the data document with the indicia such that modifications made to the data document are reflected simultaneously in the indicia by a display of the content in accordance with the graphical document processing device control element in each of the plurality of views;

an input operable to receive selection data on the associated user interface corresponding to a selection of the graphical element; and the processor further operable to commence the operation on at least one selected electronic document device in accordance with an operation linked to the selected graphical element.

16. The composite source user interface generator of claim 15 wherein the received query is directed to a selected data document of a remote data storage in accordance with preference data.

17. The composite source user interface generator of claim 16 wherein the preference data includes data representative of a selected language.

18. The composite source user interface generator of claim 15 wherein the query is comprised of an XPath query.

19. The composite source user interface generator of claim 18 wherein the data document is comprised of a document object model.

* * * * *